United States Patent
Gyori

[15] 3,699,414
[45] Oct. 17, 1972

[54] ELECTRICAL CONTROL SYSTEM
[72] Inventor: Louis Gyori, 4472 Gatineau Street, Chomedy, Quebec, Canada
[22] Filed: Oct. 15, 1971
[21] Appl. No.: 189,688

[52] U.S. Cl. ............................................. 318/139
[51] Int. Cl. ............................................. H02r 7/14
[58] Field of Search ...... 318/139, 305, 306, 308, 385, 318/386

[56] References Cited

UNITED STATES PATENTS

| | | |
|---|---|---|
| 3,188,543 | 6/1965 | Colvill et al. ............... 318/139 |
| 3,223,908 | 12/1965 | Hutchinson et al. ........ 318/139 |
| 3,249,836 | 5/1966 | Stamm .................... 318/139 X |

Primary Examiner—Bernard A. Gilheany
Assistant Examiner—W. E. Duncanson, Jr.
Attorney—Robert J. Schaap

[57] ABSTRACT

A control system for use with an electric motor which is energizable and driven through stored electrical power including first and second power sources. The control system comprises a rotatable cam which is manually operable through the action of an operator and is capable of actuating any of a plurality of successively located microswitch means in combination, and these microswitch means are connected to a plurality of solenoid actuable members containing suitable switching elements for enabling various modes of electrical power connection to the electric motor. The cam is capable of being rotated through a plurality of successive power regulating positions by manual actuation of a motor throttle mechanism. The microswitch means located at these power regulating positions control the various solenoid actuable members in such manner as to enable operative connection of the electric motor to the two power sources to provide the proper power to the motor for achieving the desired operating speed at the selected power regulating position. The switching elements are connected to provide an interlock circuit which prevents operation of the motor at any selected power regulating position until the cam has passed at least momentarily through each of the previous successively located power regulating positions. A manually operable forward-reverse mechanism is also provided for selectively controlling the application of power to the motor to cause either a forward or reverse rotation of the motor armature.

16 Claims, 1 Drawing Figure

PATENTED OCT 17 1972 3,699,414
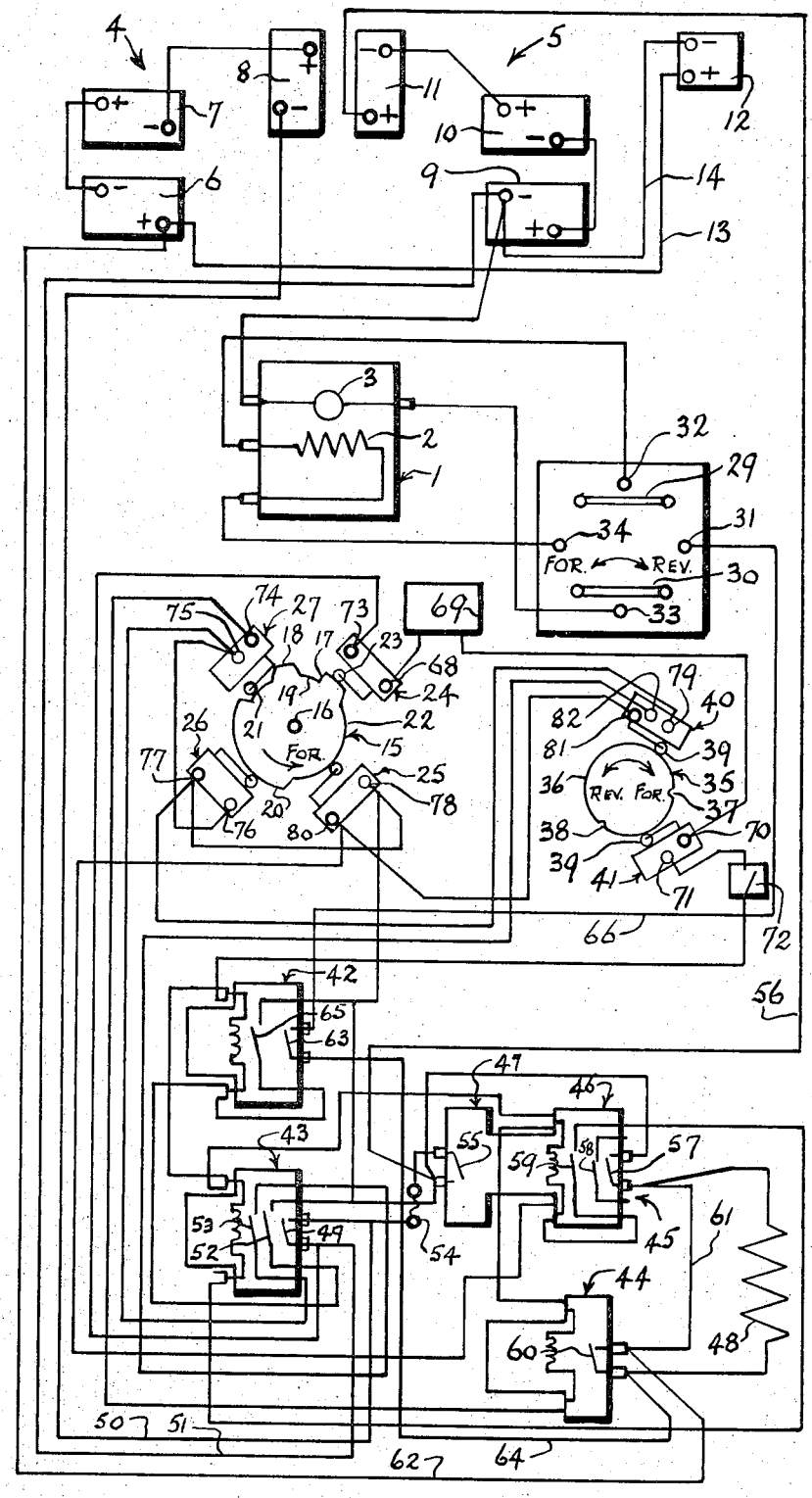

3,699,414

ELECTRICAL CONTROL SYSTEM

BACKGROUND OF THE INVENTION

This invention relates in general to certain new and useful improvements in electric control systems, and more particularly, to electric control systems for use with apparatus operable by an electric motor.

In recent years, vehicles which operate by means of stored electrical power and various electric drive systems which can be used to operate automotive vehicles have received increased attention and popularity. Typically, vehicles which operate by means of stored electrical power include an electric motor, usually a D.C. motor, providing a positive driving power to the drive wheels of the vehicle and the stored electrical power is provided by means of storage batteries, preferably of rechargeable type.

These types of electric motor driven vehicles are preferable to vehicles which use internal hydrocarbon combustion engine drives and similar types of drives for a number of reasons, including the fact that the cost of electric power is relatively inexpensive, compared to other forms of power, and hence the operating cost of the vehicle is relatively low. In addition, the construction cost of electrically driven vehicles is substantially less than the cost of manufacturing a vehicle powered by a hydrocarbon combustion engine due at least in part to the fact that electric drive systems are much simpler in overall construction, and further, maintenance costs of electrically driven vehicles are considerably lower than in vehicles powered by other types of drive systems.

However, electrical propulsion systems of the aforesaid type have normally been used only in relatively small vehicles, such as golf carts, interbuilding personnel carriers, and the like, inasmuch as present battery technology permits the storage of only a limited amount of stored electrical power. Consequently, these vehicles must be designed with constraints on maximum distance traveled, maximum speed and the like. The distance and speed constraints are dependent upon the overall weight of the vehicle, and the passengers carried by the vehicle as well as the efficiency of the motor and related drive mechanism and, to a large extent, the effectiveness of the electrical control system employed. Accordingly, electric propulsion systems of this type have been used only in a limited number of applications.

In recent years, increased attention has been directed to the use of electric propulsion systems of the type stated in larger vehicles including passenger automotive vehicles, trucks, and the like, for the above reasons as well as the serious pollution problems presented by vehicles operated with the standard hydrocarbon internal combustion engine. The typical hydrocarbon combustion engine is relatively inefficient and, accordingly, generates considerable amounts of carbon monoxide, various nitrogeneous oxides and various hydrocarbon oxidization products which are quite harmful to most life forms. As a result of recent attention to ecological consequences of pollution from internal combustion engines, there has been vocal sentiment and resultant substantial activity in the development of an electrical propulsion system which is capable of being used with automotive vehicles such as passenger automotive vehicles and the like.

One of the major problems with the adaptation of electric propulsion systems to vehicles in general is that there is presently no effective system for the conservation of the electric energy during operation of the vehicle. When the operator of the vehicle wishes to accelerate the vehicle or to start the vehicle from a rest position, he will normally open the throttle or otherwise direct power to the motor in excess of the amount capable of being used by the motor at its extant operating speed. Ideally, the electric energy should be delivered to the electric motor in a controlled and carefully regulated amount which is capable of being used by the motor to increase the speed thereof without dissipation of this energy in the form of heat or otherwise. In essence, the electric energy should be delivered to the motor in an amount which is directly related to its present speed of operation so that there is no excess energy delivery which cannot be instantaneously used by the motor. In addition, when electric energy is delivered to the motor in an excess of the amount capable of being used by the motor, which is often referred to as "over-throttling," this excess energy is not only dissipated as heat, but also often results in arcing conditions and the like, which materially reduces the operating efficiency of the motor and the overall life of the motor.

In order to obviate these problems, there have been various attempts to provide control systems which use sillicon controlled rectifiers or other types of transistorized control circuits for controlling the operation of electric motors. Many of these prior art control systems were designed to increase battery life and the overall life of the components in the control system but, nevertheless, presented many serious problems and were not particularly effective as motor controllers for electrically operable vehicles. Unless the components forming part of these transistorized types of circuits were packaged in an air-tight environment, the components would become fouled by dirt and other foreign matter normally found in the normal operating environments associated with electrically powered motor driven vehicles. By packaging the components in such air-tight environments, maintenance problems were substantially increased, due in part to the difficulty in changing components in the circuit. Furthermore, these transistorized circuits were not able to effectively withstand the considerable vibration and temperature changes which are normally present in the use of electric motor driven vehicles.

GENERAL DESCRIPTION

The present invention, therefore, provides an improved electrical control system which is capable of being used with electric motor driven vehicles and the like, and which system is highly effective in the conservation of electric power from batteries and similar electrical storage cells and which is also highly efficient in its operation.

In general terms, the present invention can be described as a control system for use with electrically operable apparatus driven from a source of electrical power and where the system comprises an actuating member movable through a plurality of successive power regulating positions from an initial power regulating position to a terminal power regulating position.

The control system also comprises a plurality of power switching elements operatively controllable by said actuating member to enable operative connection of the apparatus to the source of electrical power to thereby provide a selected amount of increasing power at each of the successive power regulating positions. Each of the power switching elements are connected in such manner to form an electrical power interlock providing automatic de-energization of said apparatus with respect to the source of electrical power, if the actuating member does not successively pass through and remain at least momentarily in each of the successive power regulating positions during movement from the initial power regulating position to the terminal power regulating position.

The electrically operable apparatus described above is generally designed for use as, though not limited to, an electric motor drive for electrically power vehicles and where the source of electrical power comprises a plurality of stored electrical power sources such as storage batteries. Therefore, in more specific terms, the present invention can be described as an electrical control system used with electrically operable apparatus, such as electrically driven vehicles, where the system comprises an actuating member in the form of a cam or other similar actuating type mechanism which is movable through a plurality of successive power regulating positions from an initial power regulating position to a terminal power regulating position. The cam or actuating member is movable by means of a manually operable member and in a vehicle, the cam or actuating member would be manually operable by means of a throttling mechanism.

The control system of the present invention also includes a plurality of inductively actuable members, such as solenoids, and where selected ones of the plurality of solenoids or other inductively actuable members are energizable in response to movement of the cam or other actuating member through the various power regulating positions. A plurality of power switching elements are controllable by the inductively actuable members to enable operative connection of the apparatus to the source of electrical power and as indicated previously, which may comprise two or more sources of stored electrical power, in order to provide selected amounts of increasing power at each of the successive power regulating positions.

These power switching elements will enable operative connection of the first and second power sources in parallel with respect to the electric motor and which motor will be shunted by a resistive element at a first power regulating position. These power switching elements will also enable operative connection of the first and second power sources in parallel with respect to the motor without shunting by the resistive element at a second power regulating position. In like manner, the power switching elements will enable operative connection of the first and second power sources in series with respect to the motor and shunted by the resistive element at a third power regulating position. Finally, the power switching elements will enable operative connection of the first and second power sources in series with respect to the electric motor without shunting by the resistive element at a fourth power regulating position.

Each of the aforesaid power switching elements are operable by the inductively actuable members and connected in such manner as to form an electrical power interlock. This power interlock is capable of providing automatic de-energization of the electric motor with respect to the source of electrical power, if the actuating member does not successively pass through and remain at least momentarily in each of the successive power regulating positions in movement from the initial power regulating position to the terminal power regulating position.

The control system of the present invention is also provided with various other components which enable effective control of electric motor circuits and the like and includes a selector means which is operatively connected to the power switching elements to enable a forward and reverse energization of the electric motor drive and forward and reverse movement of a vehicle which may be powered by the electric motor drive. In like manner, when the electric motor drive is used to propel a vehicle, a safety override switch may be operatively connected to the power switching elements for automatically de-energizing the electric motor drive when the operator disembarks from the vehicle.

In another modified form of the present invention, the subject control system may include switch means to operate in conjunction with a vehicle braking system in such manner that the control system is effective to prevent power from being applied to the electric motor when the braking system is actuated. In this connection, the electrical control system desirably includes switch means which are operable in conjunction with the cam or other actuating member so that when the braking system is actuated, the cam operated switch means creates an electrical interruption between the sources of stored electrical power and the electric motor. As indicated previously, the actuating member may be present in the form of a cam which is rotatable about a fixed axis and which cam can be operatively connected to a manually operable device such as an accelerator peddle or other throttle mechanism located in the vehicle. This throttle mechanism would be conventionally located in the vehicle and adapted for manual operation by an operator. The rotatable cam or other actuating member operates in conjunction with a series of microswitches which are adapted in part to control the various inductively actuable members and thereby in part control the power switching elements.

The first and second sources of stored electrical power may be any suitable sources capable of providing the desired capacity for the operation of the electric motor and hence the vehicle. Preferably, each of these first and second power sources are capable of providing substantially identical power capacities. Conventionally, the most common and readily available type of stored electrical power for most applications within the present invention are commercially available storage batteries with capacities which range from approximately 6 to 12 volts and in many cases 24 volts or more. However, as will be appreciated by those skilled in the art, other similar sources of stored electrical power, such as dry cell storage batteries, may be employed as the power source of the present invention. In like manner, the present invention is also operable with electrical power carried over current carrying conductors. In this case, an electrical motor or similar electrically operable apparatus which is driven through power transmitted over electrical conductors could be effectively controlled with the control system of the present invention.

The total power capacities of each of the sources of stored electrical power will vary depending on the type of vehicle or apparatus in which the present invention is incorporated. For example, while systems such as golf carts will typically have a total power capacity of approximately 36 volts, divided approximately equally between the first and second power sources, other lighter or heavier vehicles may require increased or decreased power capacities depending on their use. Each power source is typically comprised of a plurality of individual sources having an aggregate total power content sufficient to provide the required capacity for each source. Thus, for example, three or more batteries may be connected in series where each battery is a 6 volt battery, to provide a total power capacity of 18 volts for each power source.

In other general terms, the present invention may also be described as an electrically powered apparatus having a rotatable member capable of being driven at a plurality of successively increased speeds from a minimum speed to a maximum speed, the apparatus comprising an electric motor, means for supplying electric power to the motor, throttling means for controlling the speed of operation of the electric motor, an actuating member movable by said throttling means through a plurality of successive power regulating positions to operatively control the successive increased speeds of said rotatable member, and electrical interlock means operatively interposed between the means for supplying electric power and the throttling means. The electrical interlock means provides automatic de-energization of the electric motor with respect to the means for supplying electric power if the actuating member does not pass at least momentarily through each of said successive power regulating positions so that the rotatable member is driven at least momentarily at each of said successively increased speeds.

A resistive element is operatively connected across the electric motor in the manner as described above. Again, the means for supplying electrical power is typically in the form of a first and second power source. The throttling means operates the actuating member, such as a cam, which is movable through a plurality of successively located power regulating positions to enable the motor to operate at a number of selected speeds. The actuating member will permit operative connection of the first and second power sources in parallel with respect to the electric motor and shunted with the resistive element when shifted to a first power regulating position. When the actuating member is shifted to a second power regulating position, the actuating member permits operative connection of the first and second power sources in parallel with respect to the electric motor and without shunting by the resistive element. When the actuating member is shifted to a third power regulating position, it permits operative connection of the first and second power sources in series with respect to the electric motor and shunted with the resistive element. Finally, when the actuating member is shifted to the fourth power regulating position, it permits operative connection of the first and second power sources in series without shunting by the resistive element.

In further general terms, the present invention may be described as a method of controlling an electrically powered apparatus having a rotatable member capable of being driven at a plurality of successively increased speeds by means of an electric motor powered from first and second sources of electrical power and where a hunting element is optionally connectable with said electric motor. The method comprises maintaining de-energization of the motor to prevent rotation of said rotatable member in a neutral position, the connecting of the first and second electrical power sources in parallel with respect to the motor and with said shunting element operatively shunted across the motor at a first of successively increased speeds. In addition, the method includes connecting the first and second electrical power sources in parallel with respect to the motor and without shunting by the resistive element across said motor at a second of said successively increased speeds. The method further includes connecting the first and second electrical power sources in series with respect to the motor and with the shunting element operatively shunted across the motor at a third of said successively increased speeds, and finally connecting the first and second electrical power sources in parallel with respect to the motor and without shunting of the resistive element across the motor at a fourth of said successively increased speeds. Finally, automatic de-energization of the motor will take place with respect to the first and second sources of electrical power if the motor is not powered to rotate the rotatable member at least momentarily at any of the successively increased speeds.

The control system of the present invention has many advantageous features and is quite superior to the various extant and the various proposed prior art control systems and these advantageous features include a longer component life, a longer life for the stored sources of electrical power, and hence a higher speed of operation as well as a longer operating distance between recharging intervals, a highly efficient electrical system which does not suffer from voltage breakdown problems, including arcing and the like, and a control system which is highly efficient and can be operated at relatively low cost.

Having thus generally described the invention, reference will now be made to the accompanying drawing.

In the drawing which illustrates the embodiment of the invention,

FIG. 1 is a schematic view of a circuit diagram illustrating the electrical control system of the present invention.

DETAILED DESCRIPTION

Referring now in more detail and by reference characters to the drawings which illustrates a preferred embodiment of the present invention, A designates an electrical control system which is constructed in accordance with and which embodies the present invention. The control system A of the present invention is generally designed for use with vehicles which are driven with stored electrical power using a direct current electrical motor 1 having a stator or so-called "field winding" 2 and an armature 3 operable in connection therewith. The motor 1 is powered by conventional battery banks 4 and 5, the battery bank 4 comprising individual storage batteries 6, 7 and 8, while the battery bank 5 comprises individual storage batteries 9, 10 and 11. The batteries 6–11 are generally six volt or twelve volt batteries of the type normally used in automotive vehicles, such as the typical lead cell storage battery, and preferably are rechargeable.

It can be observed that the motor 1 is a series motor since the field winding 2 will always be maintained in a series connection with the armature 3 and with respect to the total source of stored electrical power, regardless of the direction of rotation of the armature 3. The present invention has been found to be highly effective with series electric motors of this type in that they provide a relatively high starting torque which is desirable in electrically motor driven vehicles and, furthermore, these motors are essentially self-regulating in that they will automatically slow down on grades due to increased current demand. However, it should be recognized that the control system A of the present invention is also operable with other types of electric motors including a shunt wound electrical motor and a compound electrical motor, including both the cumulative compound motor and the differential compound motor. Further, it should be recognized that the motor 1 is only schematically illustrated in FIG. 1, and would normally be provided with brushes, commutators and the like.

The control system A of the present invention has been found to be highly effective with electrically driven vehicles, including golf vehicles, personnel or light industrial carriers such as indoor or outdoor vehicles adapted to carry personnel between various buildings and other proximate locations, mailman transportation carriers, food transportation carriers, etc. The present invention also has application to other devices such as, for example, snowmobiles, snowblowers, small tractors and the like.

By virtue of the high operating efficiency and effective conservation of stored electrical power achieved with the control system of the present invention, this control system A is adaptable for use in conjunction with electrically driven automotive vehicles of the type which presently use internal combustion engines. In addition to the foregoing, the electrical control system A of the present invention is also highly effective for use in other types of electrical apparatus where control of an electrical dynamically operable device powered by sources of stored electrical power is required. In essence, the electrical control system A of the present invention can be used to control the effective connection of a dynamically operable element to any of a plurality of sources of electrical power. In this connection, it should be observed that while the control system A of the present invention is highly effective with stored electrical power, such as the battery banks 4 and 5, the present invention is also effective with electrical power carried over current carrying conductors and to this end, the control system of the present invention may be effectively employed in electrically operated streetcars and the like.

The battery banks 4 and 5 are designed to develop a total power capacity in an amount sufficient to operate the aforesaid vehicles or other electrical apparatus at the desired operating speed and the type of stored power selected will vary, depending upon the type of vehicle or other apparatus in which the electrical control system of the present invention is incorporated. For example, golf carts will typically use a total power capacity of about 36 volts which is divided approximately equally between the first and second battery banks 4 and 5, respectively. In other vehicles, depending on their weight and environment of use, they may require increased or decreased power capacities. In this connection, it should be observed that each of the power sources, such as the battery banks 4 and 5 may be comprised of a plurality of individual power sources such as the batteries 6-11 having an aggregate total power capacity which is sufficient to meet the power requirements. Thus, three or more batteries, such as the batteries 6, 7 and 8 may be connected in series, so that if these batteries were each twelve volt batteries, they would provide a total of 36 volts in series connection.

For purposes of describing the present invention, it may be assumed that the electrical control circuit A is operatively connected to the motor and battery banks of an automotive vehicle (not shown) which normally includes a set of driven wheels operatively connected to the motor 1. A conventional steering mechanism would also be provided for purposes of steering the vehicle. Furthermore, the vehicle would be provided with a throttle mechanism, such as an accelerator peddle or a hand operated lever, which is operatively connected to the electrical control system A for purposes of controlling the speed of the vehicle. In like manner, the vehicle would be provided with a suitable braking mechanism and various attendant safety and other operating mechanisms normally found on automotive vehicles.

The electrical control system A includes a recharging plug 12 of the type which is capable of being inserted into a conventional electrical outlet, such as a 110 volt outlet, for purposes of recharging the battery banks 4 and 5 and includes a conductive lead 13 connecting the positive terminal of the recharging plug 12 to the positive terminal of the battery 6 and a conductive lead 14 connected to the negative terminal of the recharging plug 12 and the negative terminal of the battery 9. In place of a recharging plug, a conventional junction box of the type adapted to receive an electrical plug could be appropriately mounted on the vehicle and connected in the manner described.

By further reference to FIG. 1, it can be observed that each of the battery banks 4 and 5 are preferably connected in such manner that the positive terminals of one battery in a bank are connected to the negative terminals of another battery in the same bank. Thus, the negative terminal of the battery 6 is connected to the positive terminal of battery 7 and the negative terminal of the battery 7 is connected to the positive terminal of the battery 8. In like manner, the positive terminal of the battery 9 is connected to the negative terminal of the battery 10 and the positive terminal of the battery 10 is connected to the negative terminal of the battery 11.

The electrical control apparatus A also includes a rotatable cam 15 which is mounted for rotation about a shaft 16, the latter in turn being operatively connected to the aforesaid throttle mechanism. Thus, manual actuation of the throttle mechanism by an operator will cause the shaft 16 and hence the cam 15 to rotate. Actuation of the throttle mechanism to accelerate the vehicle in either a forward or a reverse direction will result in a counter-clockwise rotation of the cam 15 and conversely, actuation of the throttle mechanism to decelerate the vehicle in either the forward or reverse direction will result in a clockwise rotation of the cam 15.

The cam 15 is provided with a pair of equally sized camming shoulders 17 and 18 which are spaced apart from each other by a recess or so-called "valley" 19 having a contact surface length approximately equal to the contact surface length of either of the camming shoulders 17 or 18. The cam 15 is also provided with a relatively long arcuately-shaped camming shoulder 20 which has an overall contact surface length equivalent to approximately four times the contact surface length of the camming shoulders 17 or 18 and the camming shoulder 20 is spaced from the camming shoulder 18 by a recess 21 having a contact surface length of approximately twice the arcuate contact surface length of the recess 19. In addition, the camming shoulder 20 is spaced from the camming shoulder 17 by a recess 22 having a contact surface length which is approximately equivalent to the length of at least four of the recesses 19. These various camming shoulders 17, 18 and 20 are designed to control cam followers 23 which are associated with a first microswitch 24 referred to as a "main" microswitch, a second microswitch 25 referred to as a "parallel" microswitch, a third microswitch 26 referred to as a "reverse" microswitch, and a fourth microswitch 27 referred to as a "resistor" microswitch. The four microswitches 24–27 are circumferentially located around the cam 15 and are approximately equally spaced from each other in the manner as illustrated in FIG. 1.

Operatively mounted on the dashboard or other convenient location within the vehicle, for manual actuation by an operator, is a forward-reverse control switch 28 of the double-throw, double-pole type. The switch 28 comprises a pair of switch levers 29 and 30 which are ganged to operate in conjunction with each other and which are capable of connecting a positive terminal 31 to either of a pair of armature connecting terminals 32 and 33, respectively. The levers 29 and 30 will also maintain operative connection between a stator connecting terminal 34 in the manner as illustrated in FIG. 1. It can thus be observed, that if the switch 28 is actuated in such manner that the levers 29 and 30 are rotated in a clockwise direction, the positive terminal 31 will be connected to the armature connecting terminal 32 and the armature connecting terminal 33 will be connected to the stator connecting terminal 34, which will permit powering of the vehicle in the reverse direction. In like manner, if the switch 28 is actuated in such manner as to propel the vehicle in a forward direction, the levers 29 and 30 are rotated in a counter-clockwise direction so that the positive terminal 31 is in electrical contact with the armature connecting terminal 33 and the armature connecting terminal 32 is in electrical contact with the stator connecting terminal 34.

The manually operable switch 28 is operatively connected to a cam 35 by suitable means (not shown), such as a shaft supporting the cam 35 and mounted for rotation with the levers 29 and 30, which causes the cam 35 to rotate in conjunction with the rotation of the switch levers 29 and 30. The cam 35 and the mechanism associated therewith (to be hereinafter described) could be suitably incorporated into the switch 28 and mounted on the dashboard or other convenient location of the vehicle, or the cam 35 may otherwise be located in an unobtrusive position in the vehicle and connected to the switch 28 by any suitable means such as a shaft of the aforesaid type or a cable or otherwise.

The cam 35 is provided with an annular peripheral camming surface 36 having a pair of recesses 37 and 38 for controlling the operation of a pair of cam followers 39 and which are, in turn, adapted to actuate the contacts of a pair of microswitches 40 and 41. When the switch levers 29 and 30 are rotated in a counter-clockwise direction, in order to enable propelling of the vehicle in a forward direction, the cam 35 is actuated to rotate in the clockwise direction, reference being made to FIG. 1, so that the cam follower 39 associated with the microswitch 41 will be located in the recess 37, thereby opening a normally closed contact (to be hereinafter described) of the microswitch 41. The operator will manually rotate the switch levers 39 and 30 in the clockwise direction to enable movement of the vehicle in the reverse direction. In this manner, the cam 35 will rotate in the counter-clockwise direction so that the cam follower 39 associated with the microswitch 40 will be located in the recess 37 and the cam follower 39 associated with the microswitch 41 will be located in the recess 38, thereby permitting the normally closed contacts of each of these microswitches 40 and 41 to open.

The electrical control apparatus A also includes three single acting solenoids 42, 43 and 44 as well as a single coil double acting solenoid 45, the latter having a primary power switching end 46 and a secondary power switching end 47. The various solenoids 42–45, which are connected in a manner to be hereinafter described in more detail, all operate in conjunction with the microswitches 24–27 and the forward-reverse switch 28 to connect the motor 1 in any of a number of power regulating conditions with respect to the battery banks 4 and 5. A current limiting resistor 48 is connected across the solenoid 44 and the primary switching end 46 of the solenoid 45 in a manner also to be hereinafter described in more detail.

When the operator of the vehicle actuates the throttle mechanism, the cam 15 will be rotated to the first power regulating position thereby permitting the various solenoids 42–45 to enable connection of the battery banks 4 and 5 in parallel with respect to the motor 1 and shunted with the resistor 48. When the cam 15 is rotated to the second power regulating position, the various solenoids 42–45 will effectively enable a parallel connection of the motor 1 with respect to the battery banks 4 and 5 without the shunting effect of the resistor 48. When the cam 15 is rotated to the third power regulating position, the solenoids 42–45 will effectively enable a series connection of the battery banks 4 and 5 with respect to the motor 1 and shunted with the resistor 48. Finally, when the cam 15 is rotated to the fourth power regulating position, the various solenoids 42–45 will effectively enable a series connection of the battery banks 4 and 5 with respect to the motor 1 without the shunting effect of the resistor 48.

The solenoids 42–45 are also connected in such manner as to provide an interlocking circuit effect resulting in an interruption of the electric power from the battery banks 4 and 5 to the motor 1 during switching between the four above-mentioned power regulating positions, in the event that the vehicle has not passed through each of the successive power regulating positions and at least momentarily remained in each of these successive power regulating positions. In other words, if the operator of the vehicle actuates the throttle sufficiently to rotate the cam 15 to the second power regulating position without at least momentarily staying in the first power regulating position, the various solenoids 42–45 and the power switching elements operated thereby, to be hereinafter described in more detail, will cooperate to provide an effective de-energization of the motor 1. In like manner, if the operator attempts to open the throttle to the position where the cam 15 rotates from the second power regulating position directly to the fourth power regulating position, without at least momentarily remaining in the third power regulating position, then the various solenoids 42–45 and the aforesaid power switching elements will operate in such manner as to provide an effective de-energization of the motor 1 with respect to the battery banks 4 and 5. In this manner, the vehicle must be moved, at least momentarily, through each of the four successive power regulating positions in successive manner. Thus, in order to achieve maximum speed of the vehicle permitted by the motor 1 when the battery banks 4 and 5 are connected in series with no resistive shunting effect, the operator must pass through the first three power regulating positions in successive order so that the vehicle remains at least momentarily in each of these power regulating conditions for control of speed. Accordingly, the operator of the vehicle cannot open the throttle completely from an initially stopped position to e.g. the second, third, or fourth power regulating position without passing through the first power regulating position. This interlocking circuit is highly effective in conserving energy of the battery banks 4 and 5 since energy from the battery banks 4 and 5 is effectively metered to the motor 1 in amounts which can be efficiently handled by the motor 1.

It can be observed that in the absence of this type of interlocking circuit mechanism, the operator of the vehicle could overthrottle the vehicle, delivering energy to the motor 1 in excess of the amount capable of being used by the motor 1 which would result in a useless and inefficient dissipation of this energy in the form of heat or otherwise. For example, if the operator of the vehicle opened the throttle sufficiently to achieve the third power regulating position without remaining at least momentarily in the first or second power regulating positions, a substantial amount of energy from the battery banks 4 and 5 would be dissipated without effective utilization of this energy. In like manner, the same would hold true if the operator would attempt to open the throttle sufficiently so that the cam 15 would rotate from any one power regulating position beyond the next successive power regulating position, as for example, from the second power regulating position to the fourth power regulating position, excess power would be supplied by the battery banks 4 and 5 and dissipated without effective utilization of the same. Thus, it can be observed that the present invention is effective in the conservation of power from the battery banks 4 and 5, thereby preserving the overall life of the batteries included within the banks 4 and 5.

The solenoid 43 is provided with a set of primary power switching contacts 49, the terminals of which are connected directly to the negative terminals of the battery 8 in the battery bank 4 and the battery 9 in the battery bank 5 by means of a main power conductors 50 and 51, respectively. The solenoid 43 is also provided with a set of auxiliary contacts or so-called "leaf" contacts 53 and a set of auxiliary contacts 53 for reasons which will presently more fully appear. The primary power switching contacts and the auxiliary or leaf contacts associated with the solenoid 43, as well as the remaining solenoids 42, 44 and 45, are preferably, though not necessarily, of the type which employ a movable contactor arm or so-called "leaf terminal" which shifts into and out of electrical contact with a stationary terminal or so-called "point terminal."

The point terminal of the primary power switching contacts 49 is connected through a fuse 54 to one point terminal of a set of primary power switching contacts 55 located in and associated with the secondary power switching end 47 of the double acting solenoid 45. The other or leaf terminal of this set of primary power switching contacts 55 is connected directly to the positive terminal of the battery 11 in the battery bank 5 by means of a main power conductor 56. This same leaf terminal of the primary power switching contacts 55 is also connected to the point terminal of a set of primary power switching contacts 57 located in and associated with the primary power switching end 46 of the double acting solenoid 45. Auxiliary contacts 58 and 59 are also operable by the energization of the coil in the solenoid 45 and are also located in the primary power switching end 46 of the solenoid 45, for reasons which will presently more fully appear. In this connection, it should be noted that the primary power switching contacts 57 and the auxiliary contacts 58 and 59 will operate in conjunction with each other and each will close when the coil of the solenoid 45 is energized. When these contacts 57, 58 and 59 are closed in the primary power switching end 46, the primary power switching contacts 55 in the second power switching end 47 of the solenoid 45 will be open. In like manner, when the coil in the solenoid 44 remains de-energized, the primary power switching contacts 55 in the secondary power switching end 47 will remain closed and hence the primary power switching contacts 57 as well as the auxiliary contacts 58 and 59 in the primary power switching end 46 will remain open.

Connected across the leaf terminal of the primary power switching contact 57 and the point terminal of a set of primary power switching contacts 60 operable by the solenoid 44 is a conductor 61. It should be observed that the current limiting resistor 48 is connected from the leaf terminal of the primary power switching contacts 57 operable by the solenoid 45 to the leaf terminal of the primary power switching contact 60 operable by the solenoid 44. Furthermore, the point terminal of the power switching contact 60 is connected through a main power conductor 62 to the positive terminal of the battery 6 in the battery bank 4. Thus, it can be observed that the leaf terminal of the primary power switching contacts 57 is also supplied with this positive current from the battery 6.

The leaf terminal of the power switching contact 60 is also connected to the leaf terminal of a set of primary power switching contacts 63 operable by the solenoid 42, through a current carrying conductor 64, the solenoid 42 also containing a set of auxiliary contacts 65. The point terminal of the primary power switching contacts 63 is connected through a conductor 66 to the positive terminal 31 of the forward-reverse switch 28, in the manner as illustrated in FIG. 1. Further, a positive voltage is also supplied to the leaf terminal of the power switching contacts 55 operable by the solenoid 45, through conductor 56 which is connected in the positive terminal of the battery 11 in the battery bank 5 as aforesaid.

It can be observed that one terminal of the field winding 2 is connected directly to a negative terminal of the battery 9, and the other terminal of the field winding 2 will receive a positive voltage through the forward-reverse switch 28 which is initially applied at the positive terminal 31. In like manner, one of the terminals of the armature 3 will receive a negative voltage ultimately from this negative terminal of the battery 9 through the forward-reverse switch 28 and the positive voltage from the forward-reverse switch 28 which is applied at the positive terminal 31. Thus, it can be observed that the motor 1 is continually supplied with a negative voltage from the stored power battery banks, and receives a positive voltage only through the forward-reverse switch 28 and through the conductor 66.

The main microswitch 24 is provided with a common switch contact terminal 68 which is connected to one terminal of a brake solenoid 69 suitably mounted on the vehicle and operating a braking mechanism (not shown) in response to energization and de-energization thereof. Typically, the brake solenoid 49 is of the type which would actuate a braking mechanism to each of the wheels of the vehicle when in the de-energized condition and which would permit release of the braking mechanism when in the energized condition. The other terminal of the brake solenoid 69 is connected to a normally closed switch contact terminal 70 on the microswitch 41 for selective energization of the braking solenoid 69 in a manner to be hereinafter described in more detail. The braking solenoid 69 may also be of the type which is energizable in response to actuation of the brake pedal or other brake mechanism normally located in the operator's compartment of the vehicle so that when the brake pedal is actuated, the solenoid 69 will be energized, closing switches which prevent further power delivery to the motor 1.

The microswitch 41 is also provided with a normally open switch contact terminal 71 which is connected through a safety override switch or so-called "deadman switch" 69 to the upper terminal of the coil on the solenoid 42 in the manner as illustrated in FIG. 1. The safety override switch 72 is a normally open switch which is automatically closed when the operator enters the passenger compartment of the vehicle. Thus, this switch 72 could be located under the seat cushion of the vehicle and automatically closed through the weight of the operator when seated, or the switch 72 could be located in substantially any position where it is automatically closed by the presence of the operator in the passenger compartment of the vehicle. In this manner, if the operator should suddenly leave the vehicle for any reason, the safety override switch 69 will automatically open thereby breaking the circuit to the motor 1 to prevent further delivery of driving power to the wheels of the vehicle. In like manner, a manually operable switch could be located in the operator's compartment of the vehicle in place of or in addition to the safety override switch 72.

It should be observed that the electrical control system A could also be provided with other safety override switches and/or additional safety mechanisms which prevent further operation of the vehicle upon the occurrence of a predetermined condition. In like manner, other fuses or similar circuit breaking mechanisms could be employed in addition to or in place of the fuse 54 for preventing current overloading of the various components included in the control system A.

The main microswitch 24 is also provided with a normally closed switch contact terminal 73 which is connected to the leaf terminal of the primary power switching contacts 49. The resistor microswitch 27 is similarly provided with a common switch contact terminal 74 connected to the lower terminal of the coil in the solenoid 44, reference being made to FIG. 1. The resistor microswitch 27 is also provided with a normally open switch contact terminal 75 which is connected to a normally closed switch contact terminal 76 on the reverse microswitch 26 and which terminal 75 is also connected to the point terminal of the auxiliary contacts 59 operable by the solenoid coil 46. In like manner, the reverse microswitch 26 is provided with a common switch contact terminal 77 which is connected to a first normally closed switch contact terminal 78 on the parallel microswitch 25 and which is also connected to a common switch contact terminal 79 on the microswitch 40. The normally closed switch contact terminal 78 on the parallel microswitch 25 is also connected to the point terminal of the auxiliary contacts 65 on the solenoid 42 and this terminal of the auxiliary contacts 65 is, in turn, connected to the point terminal of the auxiliary contacts 52 on the solenoid 43. Finally, this point terminal of the auxiliary contacts 52 is similarly connected to the leaf terminal of the main power switching contacts 55. The parallel microswitch 25 is also provided with a common switch contact terminal 80 which is connected to a normally closed switch contact terminal 81 on the microswitch 40 and to the lower terminal of the coil in the primary power switching end 46 of the solenoid 45. Furthermore, this switch contact terminal 80 is likewise connected to the leaf terminal of the auxiliary contacts 59 on the primary power switching end 46 of the solenoid 45.

It can also be observed that the microswitch 40 is provided with a normally opened switch contact terminal 82 which is connected to the point terminal of the auxiliary contacts 53 on the solenoid 43. The safety override switch 72 is connected to the upper terminal of the coil in the solenoid 42, as indicated previously, and similarly, the conductor from the safety override switch 72 is also ultimately connected to the upper terminals of the coils in the solenoids 43, 44 and 45 in the manner as illustrated in FIG. 1. The lower terminal of the coil in the solenoid 43 is also connected to the point terminal of the auxiliary contacts 59 in the solenoid 45. Similarly, the lower terminal of the coil in the solenoid 42 is connected to the leaf terminal of the auxiliary contact 52 in the solenoid 43.

In operation, the operator of the vehicle may initiate movement of the vehicle in either a forward or reverse direction by rotating the commonly actuated switch levers 29 and 30 of the switch 28 to either the forward or the reverse position. In this connection, it should be observed that the vehicle may be suitably provided with a key operated main switch or lock to prevent any unauthorized use of the vehicle. When the switch levers 29 and 30 have been shifted to either the forward or the reverse position, they will permit energization of the field winding 2 and the armature 3 in such manner as to cause the armature 3 to rotate in either the forward or the reverse direction, as selected through the switch 28.

When the switch levers 29 and 30 have been shifted to the forward position, that is rotated in the counter-clockwise direction so that one end of the lever 30 engages the positive terminal 31, the cam 35 will have rotated in the clockwise direction. As this occurs, the recess 37 in the cam 36 will receive the cam follower 39 associated with the microswitch 41 thereby opening the normally closed contact terminal 70 and closing the normally open contact terminal 71. The conditions of the contacts in the microswitch 40 will remain the same since the cam follower 39 associated with the microswitch 40 will remain on the camming surface 36. However, if the switch 28 is actuated so that the levers 29 and 30 are switched to the reverse position, the cam 35 will rotate in the counter-clockwise direction and the recess 37 will receive the cam follower 39 associated with the microswitch 40 while the recess 38 will receive the cam follower 39 associated with the microswitch 41. In this case, the normally open contact terminal 82 will close and the normally closed contact terminal 81 will open in the microswitch 40.

If the operator then wishes to propel the vehicle in the forward direction, he will actuate the throttle mechanism in such manner as to cause the cam 15 to rotate in the counter-clockwise direction. It should be observed that the safety switch 72 will be in the closed condition since the operator is located in the operator's compartment of the vehicle. Typically, the vehicle could be provided with a conventional accelerator pedal (not shown) capable of being actuated by the foot of the operator and this pedal would be connected to the shaft 16 so that actuation of the pedal would cause rotation of the shaft 16 and hence the cam 15. A conventional rack and pinion gear arrangement operatively connected between the accelerator pedal and the shaft 16 could be employed to maintain this operative relationship.

It should be observed that the position of the cam illustrated in FIG. 1 is the "neutral position" which does not permit any energization of the motor 1. Rotation of the cam 19 in the counter-clockwise direction will cause the cam follower 23 on the main microswitch 24 to shift to the elongated recess 22 thereby opening the normally closed contact terminal 73 on the microswitch 24. The condition of the resistor microswitch 27 will not change inasmuch as the cam follower 23 of this microswitch 27 will merely move in and not out of the recess 21. In like manner, no change of condition will occur in either of the microswitches 25 or 26. Thus, when the cam 15 is rotated in the counter-clockwise direction, for a distance equivalent to the length of one of the camming surfaces 17 or 18, the cam 15 will have been shifted to the first power actuating position.

When the cam 15 has been rotated to the first power regulating position, the normally closed contact terminal 70 on the microswitch 41 will open permitting release of the brake solenoid 69 and hence the brake of the vehicle. Furthermore, the normally open contact terminal 71 of the microswitch 41 will close permitting current to flow to each of the coils in each of the solenoids 42–45.

Thus, it can be observed by reference to FIG. 1, that in the neutral position, the cam follower 23 associated with the main microswitch 24 and the reverse microswitch 26 will be in the actuated or so-called "closed" position so that the normally closed contact terminal 73 is opened and the normally closed contact terminal 76 is opened. However, when the cam 19 is rotated to the first power regulating position, the cam follower 23 associated with the main microswitch 24 will shift to the recess 22 thereby opening the normally closed contact 73 of the main microswitch 24 and the cam follower 23 associated with the reverse microswitch 26 will still remain on the camming surface 20 thereby holding the normally closed contact terminal 76 in the open condition. In addition, the conditions of the microswitches 25 and 27 will not change and will still remain open so that the normally closed contact terminal 78 will remain closed and the normally open contact terminal 75 will remain open.

With the positions of the contact terminals thus described, power is supplied to the normally closed contact 78 of the microswitch 24, and power will therefore be delivered to the normally closed contact 81 of the microswitch 40 and in addition, to the lower terminal of the coil in the solenoid 45. Energization of the coil 45 will permit a closing of the contacts 57, 58 and 59. Closing of the contacts 59 will permit current to be delivered to the lower terminal of the coil in the solenoid 43 thereby closing the contacts 52 and 53 operable by this coil. In addition, energization of the solenoid 43 will permit an energization of the solenoid 42 enabling the closing of the contacts 63 and 65. As the contact 65 closes, positive polarity power will be delivered directly to the terminal 31 on the forward-reverse switch 28, and the resistor 48 will be coupled in parallel with the two battery banks 4 and 5, with respect to the motor 1. Thus, it can be observed that by having rotated the cam 15 to the first power regulating position, the battery banks 4 and 5 have been connected in parallel with respect to the motor 1 and, in addition, the resistor 48 has been effectively shunted across the motor 1.

When the operator of the vehicle shifts the throttle mechanism so that the cam 15 rotates to the second power regulating position, the cam follower associated with the main microswitch 24 will still remain in the recess 22 thereby permitting the normally closed contact terminal 73 to open. In like manner, the parallel microswitch 25 will also remain open since the cam follower 23 associated therewith is located in the recess 22 thereby holding the normally closed contact terminal 78 closed. The reverse microswitch 26 will still remain closed, since the cam follower 23 associated therewith remains on the contact surface 20 holding the normally closed contact terminal 76 closed. In addition, the cam follower 23 associated with the resistor microswitch 27 will shift to the camming shoulder 18 thereby closing the normally open contact terminal 75. By tracing through the circuit of FIG. 1, it can be observed that all four solenoids 42–45 will be energized and further, the battery banks 4 and 5 will be connected in parallel with respect to the motor 1. However, it should also be observed that since the solenoid 44 is now energized, the conductor 61 will essentially short or shunt the resistor 48 and in this manner, prevent the resistor 48 from effectively shunting the motor 1. Thus, a higher current level can be delivered to the motor 1 when the cam 15 has been rotated to the second power regulating position.

By opening the throttle of the vehicle still further, the operator can rotate the cam 15 to the third power regulating position where the cam followers 23 associated with both the reverse microswitch 26 and parallel microswitch 25 will be located on the camming shoulder 20 and in this manner open the normally closed contact terminal 76 of the microswitch 26 and open the normally closed contact terminal 78 of the microswitch 24. The cam follower 23 associated with the resistor microswitch 27 will have shifted to the recess 19 thereby holding the normally open contact terminal 75 in the open condition. The cam follower 23 associated with the main microswitch 24 will still remain in the recess 22 thereby permitting the normally closed contact terminal 73 to remain closed. Again, it can be observed that by examination of the circuit of FIG. 1, the motor 1 will be connected in series with the battery banks 4 and 5 and in addition, the resistor 48 will shunt the motor 1. Further, it should be noted that this type of shunted serial connection of the motor 1 to the battery banks 4 and 5 provides more power to the motor 1, than is provided in either of the first or second power regulating positions.

Continued actuation of the throttle mechanism by the operator of the vehicle will cause the cam 15 to rotate to the fourth power regulating position where the cam follower 23 associated with the resistor microswitch 27 will be located on the camming shoulder 17 and the cam follower 23 associated with the parallel microswitch 25 will be located on the camming shoulder 20. In this manner, the normally closed contact terminal 78 of the parallel microswitch 25 will open and the normally open contact terminal 75 of the resistor microswitch 27 will close. The cam follower 23 associated with the reverse microswitch 26 will be located in the recess 21 and therefore the normally closed contact terminal 76 will open. In like manner, the cam follower 23 associated with the main microswitch 24 will be located in the recess 22 and therefore the normally closed contact terminal 73 will open. In this manner, it can be observed by examination of the circuit in FIG. 1, that the battery banks 4 and 5 will be connected in series with respect to the motor 1 and the conductor 61 will essentially short the resistor 48. Further, it can be observed that in this last mode of operation the full power of the battery banks 4 and 5 in serial connection is delivered to the motor 1.

If the operator of the vehicle desires to reverse the direction of the vehicle, the levers 29 and 30 are shifted to the opposite position which causes the cam 35 to rotate in the counter-clockwise direction. As this occurs, the cam follower 39 associated with the microswitch 40 will be located in the recess 37 and the cam follower 39 associated with the microswitch 41 will be located in the recess 38. Therefore, the normally closed contact terminal 81 of the microswitch 40 will open, the normally open contact terminal 82 of the microswitch 40 will close and, similarly, the normally open contact terminal 71 of the microswitch 41 will close and the normally closed contact terminal 70 of the microswitch 41 will open. Thus, it can be seen that power can be supplied to the motor 1 in a manner similar to that when the vehicle is propelled in the forward direction, except that the polarity of the armature 3 will be reversed with respect to the field winding 2 thereby causing the armature 3 to rotate in the opposite direction. Furthermore, it should be observed that the motor can operate in either of two reverse speeds by virtue of the circuitry employed in the electrical control system A.

It should be noted that the various solenoids 42–45 are connected in such manner that selected ones of these solenoids 42-45 associated with each power regulating position are successively energized when the cam 15 is moved to the selected power regulating position. Inasmuch as there is a finite time required for the opening and closing of the contacts in the solenoids, a successive solenoid in the circuit cannot be energized for at least the finite time required for a previous solenoid in the circuit to have been energized and the contacts thereof to have been shifted to the closed position. Thus, the vehicle must remain at least momentarily in each of the power regulating positions prior to the opening of the throttle mechanism and hence rotation of the cam 15 to the next power regulating position, or otherwise, the motor 1 will be automatically de-energized. Thus, the various solenoids 42-45 and the contacts associated therewith provide an electrical interlock which enables effective utilization of the energy stored in the battery banks 4 and 5 and, further, prevents the dissipation of this energy without effective utilization of the same. For example, if the operator of the vehicle attempts to open the throttle mechanism so that the cam 15 would rotate from the first power regulating position directly to the third power regulating position, excess power would normally be supplied by the batteries 4 and 5 and a substantial portion of this power would be dissipated without being effectively employed in the movement of the vehicle. However, by virtue of the electrical interlock, the motor will be de-energized as stated above. In normal operation the operator will be required to actuate the throttle mechanism so that the cam 15 will rotate and successively pass through, at least momentarily, each of these power regulating positions.

It should be noted that the size of the resistor 48 employed in the electrical control system A will vary depending upon several factors including for example, the resistance encountered in various components in the circuit, the voltage delivered by the battery banks 4 and 5, and the degree to which it is desired to reduce the voltage of the power sources 4 and 5 when the resistor 48 is shunted across the motor 1.

While the electrical control system A has been described in connection with a particular preferred embodiment, and in conjunction with the use of stored electrical power, it is apparent that the electrical control system A can be used to operate with electrical power supplied over current carrying conductors or other forms of electrical power delivery. In addition, it should be understood that the electrical control system A can be used in conjunction with other apparatus operating on either the basis of stored electrical power or electrical power delivered over conductors, or otherwise, in order to control an electrically dynamically operable device.

The invention is further illustrated by, but not limited to, the following example:

EXAMPLE

A test was conducted with a vehicle provided with the control system of the present invention (applicant's vehicle) and a similar vehicle which was provided with a prior art control system. The conventional vehicle and the vehicle used by applicant were similar in construction and had substantially nearly equal weights and used substantially similar drive mechanisms, except for the control circuits employed.

The characteristics for each of these vehicles is provided in the following Table 1.

TABLE I

|  | Conventional | Applicant |
|---|---|---|
| Vehicle weight | 1,027 lbs. | 1,114 lbs. |
| Weight of operator | 145 lbs. | 145 lbs. |
| Total weight | 1,172 lbs. | 1,259 lbs. |
| Electrical system | 6 batteries (6 volts each) | 8 batteries (6 volts each) |
| Motor voltage | 36 volts | 24 volts |
| Ratio of the differential unit | 6 ½:1 | 6:1 |
| Wheel diameter | 18 inches | 18 inches |
| Motor amperage | 53 amperes | 60 amperes |
| Maximum speed | 12.1 MPH | 10 MPH |
| Acceleration from 0 MPH to maximum | 4.2 sec. | 8 sec. |

Each of the vehicles having the above described characteristics were operated with battery current measurements and voltage measurements across the motor being made at periodic intervals. During the course of the test, the batteries in each of the vehicles were recharged. The conventional vehicle employed six lead-acid conventional storage batteries each providing 6 volts and the batteries were capable of being connected in either parallel or serial relationship with respect to the motor and were also capable of being shunted with a resistive element in both the serial and parallel arrangements. The batteries were connected in two banks with three batteries in each bank.

In applicant's vehicle, eight lead-acid conventional storage batteries were employed and each battery provided 6 volts. The batteries were connected in two banks with four batteries in each bank. The two battery banks were also capable of being connected in parallel or serial arrangement with respect to the motor and capable of being shunted with a resistive element in each of the parallel and serial arrangements as described above. The test measurements made on the conventional vehicle are set forth in Table II and the test measurements made on the applicant's vehicle are set forth in Table III below.

TABLE II.—CONVENTIONAL

| Total hours of operation | Battery current | | | | | | Average current | Voltage | Remarks |
|---|---|---|---|---|---|---|---|---|---|
| | A | B | C | D | E | F | | | |
| 1.2 | 12.10 | 12.10 | 12.25 | 12.00 | 12.25 | 12.25 | 12.15 | 36.0 | |
| 1.2 | 11.25 | 11.25 | 11.25 | 11.10 | 11.25 | 11.15 | 11.20 | 35.0 | |
| 2.3 | 10.00 | 10.00 | 10.00 | 10.00 | 10.00 | 10.00 | 10.00 | 30.0 | |
| 2.3 | 12.75 | 12.75 | 12.75 | 12.75 | 12.75 | 12.75 | 12.75 | 40.0 | Batteries fully charged. |
| 3.1 | 12.25 | 12.25 | 12.25 | 12.25 | 12.25 | 12.25 | 12.25 | 36.0 | |
| 3.4 | 11.75 | 11.75 | 11.75 | 11.75 | 11.75 | 11.75 | 11.75 | 36.0 | |
| 3.8 | 11.60 | 11.60 | 11.60 | 11.50 | 11.60 | 11.60 | 11.58 | 36.0 | |
| 4.0 | 11.50 | 11.50 | 11.65 | 11.25 | 11.50 | 11.50 | 11.50 | 35.0 | |
| 5.0 | 11.00 | 11.00 | 11.00 | 11.00 | 11.00 | 11.00 | 11.00 | 33.0 | Vehicle stopped. |
| 5.1 | 12.80 | 12.80 | 12.80 | 12.80 | 12.80 | 12.80 | 12.80 | 40.0 | |
| 5.9 | 10.00 | 10.00 | 10.00 | 10.00 | 10.00 | 10.00 | 10.00 | 30.0 | Short circuit. |

TABLE III.—APPLICANT

| Total hours of operation | A | B | C | D | E | F | G | H | Amps | Voltage | Remarks |
|---|---|---|---|---|---|---|---|---|---|---|---|
| 1.0 | 12.75 | 12.50 | 12.75 | 12.75 | 12.75 | 12.75 | 12.75 | 13.00 | 12.75 | 25.0 | Batteries fully charged. |
| 1.2 | 12.25 | 12.25 | 12.25 | 12.25 | 12.35 | 12.35 | 12.50 | 12.50 | 12.33 | 24.2 | |
| 2.2 | 12.25 | 12.25 | 12.25 | 12.25 | 12.35 | 12.35 | 12.50 | 12.50 | 12.33 | 24.0 | |
| 2.9 | 12.10 | 12.00 | 12.10 | 12.00 | 12.25 | 12.25 | 12.35 | 12.25 | 12.16 | 24.0 | |
| 3.2 | 12.00 | 12.00 | 12.00 | 12.00 | 12.10 | 12.10 | 12.20 | 12.10 | 12.06 | 24.0 | |
| 4.6 | 11.75 | 11.75 | 11.75 | 11.75 | 11.75 | 11.75 | 11.85 | 11.75 | 11.76 | 24.0 | |
| 6.1 | 11.30 | 11.30 | 11.30 | 11.30 | 11.30 | 11.30 | 11.30 | 11.30 | 11.30 | 24.0 | |
| 6.6 | 11.25 | 11.25 | 11.25 | 11.40 | 11.25 | 11.40 | 11.40 | 11.30 | 23.2 | | |
| 9.7 | 10.00 | 10.00 | 10.00 | 10.00 | 10.00 | 10.00 | 10.00 | 10.00 | 10.00 | 20.4 | Vehicle stopped. |
| 9.7 | 12.80 | 12.80 | 12.80 | 12.80 | 12.80 | 12.80 | 12.80 | 12.80 | 12.80 | 25.0 | |
| 11.6 | 12.50 | 12.50 | 12.35 | 12.50 | 12.35 | 12.35 | 12.50 | 12.50 | 12.43 | 24.0 | |

It can be observed from the test measurements that applicant's vehicle is capable of being operated for a substantially longer time than the conventional vehicle. In addition, it can be observed that the average amperage after 11.6 hours of operation in applicant's vehicle was substantially higher than the average amperage after 5.9 hours of operation in the conventional vehicle. Furthermore, the voltage applied across the motor in applicant's vehicle was substantially lower after 11.6 hours of operation than the voltage applied across the motor in the conventional vehicle after 5 hours of operation. In addition, it can be observed that the conventional vehicle stopped after 5.0 hours of operation and applicant's vehicle stopped after 9.7 hours of operation. The batteries short circuited in the conventional vehicle after 5.9 hours of operation and the batteries in applicant's vehicle did not short circuit even after 11.6 hours of operation.

These test results demonstrate the high degree of effectiveness achieved with the electrical control system of the present invention in that the vehicle equiped with the subject control system can operate for a much longer time, than the conventional vehicle, the batteries have a higher remaining charge than the batteries in the conventional vehicle after a longer period of operation and that the voltage across the motor is less after a longer period of operation. In addition, these test results demonstrate that while the maximum speed of applicant's vehicle is slightly less than the conventional vehicle, acceleration rates are much greater.

Thus, there has been shown and described novel means for controlling the delivery of electrical power to a motor which fulfills all of the objects and advantages sought therefor. Many changes, modifications, variations and other uses and applications of the subject system will, however, become apparent to those skilled in the art after considering this specification and the accompanying drawing. All such changes, modifications, variations and other uses and applications which do not depart from the spirit and scope of the invention are deemed to be covered by the invention which is limited only by the claims which follow.

I claim:

1. A control system for use with electrically operable apparatus driven from a source of electrical power, said system comprising an actuating member movable through a plurality of successive power regulating positions from an initial power regulating position to a terminal power regulating position, and a plurality of power switching elements operatively controllable by said actuating member to enable operative connection of said apparatus to said source of electrical power to provide a selected amount of increasing power at each of said successive power regulating positions, each of said power switching elements being connected in such manner to form an electrical power interlock providing automatic deenergization of said apparatus with respect to said source of electrical power if said actuating member does not successively pass through and remain at least momentarily in each of said successive power regulating positions during movement from said initial power regulating position to said terminal power regulating position.

2. The control system of claim 1 further characterized in that said source of electrical power comprises a plurality of stored electrical power sources, and said power switching elements enable operative connection between said electrically operable apparatus and said electrical power sources in a plurality of operative connection forms to provide said selected amounts of power at each of said power regulating positions.

3. The control system of claim 1 further characterized in that said system comprises a plurality of inductively actuable members, selected ones of said plurality of inductively actuable members being energizable in response to movement of said actuating member through said power regulating positions, and said power switching elements being controllable by said plurality of inductively actuable members to enable operative connection of said apparatus to said sources of electrical power.

4. The control system of claim 1 further characterized in that said inductively actuable members are solenoids and that said actuating member is a cam.

5. The control system of claim 1 further characterized in that said electrically operable apparatus is an electric motor drive for electrically powered vehicles and said source of electrical power comprises a plurality of storage batteries.

6. The control system of claim 1 further characterized in that said system comprises a resistive element operatively connectable with respect to said electrically operable apparatus, said source of electrical power comprises first and second stored electrical power sources, and that said power switching elements enable operative connection of said first and second power sources in parallel with respect to said electrically operable apparatus and shunted with said resistive element at a first power regulating position, said power switching elements also enable operative connection of said first and second power sources in parallel with respect to said electrically operable apparatus without shunting by said resistive element at a second power regulating position.

7. The control system of claim 1 further characterized in that said system comprises a resistive element operatively connectable with respect to said electrically operable apparatus, said source of electrical power comprises first and second stored electrical power sources, and that said power switching elements enable operative connection of said first and second power sources in parallel with respect to said electrically operable apparatus and shunted with said resistive element at a first power regulating position, said power switching elements enable operative connection of said first and second power sources in parallel with respect to said electrically operable apparatus without shunting by said resistive element at a second power regulating position, said power switching elements enable operative connection of said first and second power sources in series with respect to said electrically operable apparatus and shunted with said resistive element at a third power regulating position, and said power switching elements enable operative connection of said first and second power sources in series with respect to said electrically operable apparatus without shunting by said resistive element at a fourth power regulating position.

8. The control system of claim 5 further characterized in that said system comprises selector means operatively connected to said power switching elements enabling a forward and reverse energization of said electric motor drive and forward and reverse movement of said electrically powered vehicles.

9. The control system of claim 1 further characterized in that said electrically operable apparatus is an electric motor drive for electrically powered vehicles and said source of electrical power comprises a plurality of storage batteries, and that safety override switch means is operatively connected to said power switching elements for automatically deenergizing said electric motor drive when an operator disembarks from said vehicle.

10. The control system of claim 1 further characterized in that said electrically operable apparatus is an electric motor drive for electrically powered vehicles and said source of electrical power comprises a plurality of storage batteries, and that brake means is operatively connected to said power switching elements to prevent operative connection between said first and second sources of power and said electric motor when said brake means is actuated.

11. An electrically powered apparatus having a rotatable member capable of being driven at a plurality of successively increasing speeds from a minimum speed to a maximum speed, said apparatus comprising an electric motor, means for supplying electric power to said electric motor, throttling means for controlling the speed of operation of said electric motor, and electrical interlock means operatively interposed between said means for supplying electric power and said throttling means to provide automatic deenergization of said electric motor with respect to said means for supplying electric power if said electric motor does not operate so that said rotatable member is driven at least momentarily at each of said successively increased speeds.

12. The electrically powered apparatus of claim 11 further characterized in that said electrically powered apparatus is an electrically powered vehicle and that said rotatable member constitutes a drive member operable by said electric motor.

13. The electrically powered apparatus of claim 11 further characterized in that a resistive element is optionally operatively connected across said electric motor, said means for supplying electric power comprises first and second power sources, and said throttling mechanism includes an actuating member movable through a plurality of successive power regulating positions to enable said motor to operate at a plurality of speeds in said successively increased speeds when said actuating member is shifted through said plurality of power regulating positions, said actuating member being shiftable to a first power regulating position permitting operative connection of said first and second power sources in parallel with respect to said electric motor and shunted with said resistive element, and said actuating member being shiftable to a second power regulating position permitting operative connection of said first and second power sources in parallel with respect to said electric motor and without shunting by said resistive element.

14. The electrically powered apparatus of claim 11 further characterized in that a resistive element is optionally operatively connected across said electric motor, said means for supplying electric power comprises first and second power sources, and said throttling mechanism includes an actuating member movable through a plurality of successive power regulating positions to enable said motor to operate at a plurality of speeds in said successively increased speeds when said actuating member is shifted through said plurality of power regulating positions, said actuating member being shiftable to a first power regulating position permitting operative connection of said first and second power sources in parallel with respect to said electric motor and shunted with said resistive element, said actuating member being shiftable to a second power regulating position permitting operative connection of said first and second power sources in parallel with respect to said electric motor and without shunting by said resistive element, said actuating member being shiftable to a third power regulating position permitting operative connection of said first and second power sources in series with respect to said electric motor and shunted with said resistive element, and said actuating member being shiftable to a fourth power regulating position permitting operative connection of said first and second power sources in series without shunting by said resistive element.

15. The method of controlling an electrically powered apparatus having a rotatable member capable of being driven at a plurality of successively increased speeds by means of an electric motor powered from first and second sources of electrical power and where a shunting element is optionally connectable with respect to said electric motor, said method comprising maintaining deenergization of said motor to prevent rotation of said rotatable member in a neutral condition, connecting said first and second electrical power sources in parallel with respect to said motor and with said shunting element operatively shunted across said motor at a first of said successively increased speeds, connecting said first and second electrical power sources in parallel with respect to said motor and without shunting said shunting element across said motor at a second of said successively increased speeds, and automatically deenergizing said motor with respect to said first and second sources of electrical power if said motor is powered to rotate said rotatable member at said second speed if said motor is not powered to rotate said rotatable member at least momentarily at said first speed.

16. The method of controlling an electrically powered apparatus of claim 15 further characterized in that said method comprises a rotatable member capable of being driven at a plurality of successively increased speeds by means of electric motor powered from first and second sources of electrical power and where a shunting element is optionally connectable with respect to said electric motor, said method comprising maintaining deenergization of said motor to prevent rotation of said rotatable member in a neutral condition, connecting said first and second electrical power sources in parallel with respect to said motor and with said shunting element operatively shunted across said motor at a first of said successively increased speeds, connecting said first and second electrical power sources in parallel with respect to said motor and without shunting said shunting element across said motor at a second of said successively increased speeds, connecting said first and second electrical power sources in series with respect to said motor and with said shunting element operatively shunted across said motor at a third of said successively increased speeds, connecting said first and second electrical power sources in series with respect to said motor and without shunting said shunting element across said motor at a fourth of said successively increased speeds, and automatically deenergizing said motor with respect to said third and fourth sources of electrical power if said motor is powered to rotate said rotatable member at any speed without at least passing momentarily through any preceeding speed in said plurality of successively increased speeds.

* * * * *